United States Patent
Sato

(10) Patent No.: US 10,530,466 B1
(45) Date of Patent: Jan. 7, 2020

(54) WIRELESS COMMUNICATION MANAGEMENT APPARATUS, WIRELESS COMMUNICATION MANAGEMENT SYSTEM, AND WIRELESS COMMUNICATION MANAGEMENT METHOD

(71) Applicant: Panasonic Intellectual Property Management Co., Ltd., Osaka (JP)

(72) Inventor: Daiki Sato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/524,595

(22) Filed: Jul. 29, 2019

(51) Int. Cl.
| | |
|---|---|
| *H04W 4/00* | (2018.01) |
| *H04B 7/185* | (2006.01) |
| *G06K 9/00* | (2006.01) |
| *H04W 4/029* | (2018.01) |
| *H04W 76/10* | (2018.01) |

(52) U.S. Cl.
CPC ..... *H04B 7/18506* (2013.01); *G06K 9/00288* (2013.01); *H04W 4/029* (2018.02); *H04W 76/10* (2018.02)

(58) Field of Classification Search
CPC .. H04B 7/18506; H04W 4/029; H04W 76/10; H04W 24/00; H04W 72/00; H04W 48/18; H04W 4/42; G06K 9/00288; B64D 11/00151; B64D 11/0015; G09B 29/007; G09B 29/10; B60K 35/00; G06Q 30/0241; H04N 7/18; H04Q 7/20; G01S 3/32; G01S 3/48; G01S 3/14

USPC .................................. 455/431; 725/75
See application file for complete search history.

(56) References Cited

U.S. PATENT DOCUMENTS

| | | | | |
|---|---|---|---|---|
| 8,806,543 | B1 * | 8/2014 | Curtis | B64D 11/00151 725/75 |
| 8,891,660 | B1 * | 11/2014 | Wise | H04B 7/0817 375/267 |

(Continued)

FOREIGN PATENT DOCUMENTS

| | | | |
|---|---|---|---|
| EP | 2 774 850 | 9/2014 | |
| EP | 2774850 A2 * | 9/2014 | ......... B64D 11/0015 |

(Continued)

*Primary Examiner* — Mahendra R Patel
(74) *Attorney, Agent, or Firm* — Wenderoth, Lind & Ponack, L.L.P.

(57) ABSTRACT

The wireless communication management apparatus is connectable to one or more display devices and provides a service of wireless communication to a user in front of the display device. The wireless communication management apparatus comprises a communication unit for acquiring an image of the user and a controller including a circuit. The controller is operable to determine whether the wireless communication is enabled or disabled and determine the wireless terminal used by the user based on the image. The controller is further operable to cause the display device to output connection information when the wireless communication is enabled. The connection information indicates how to make a wireless connection for performing the wireless communication using the wireless terminal. The connection information is information corresponding to the determined wireless terminal.

11 Claims, 6 Drawing Sheets

(56) References Cited

U.S. PATENT DOCUMENTS

| | | | | |
|---|---|---|---|---|
| 8,928,796 | B2* | 1/2015 | Van Heugten | H04N 5/2258 348/340 |
| 10,430,128 | B2* | 10/2019 | Nagasawa | G06F 3/1222 |
| 2007/0032246 | A1* | 2/2007 | Feher | H04W 64/00 455/456.1 |
| 2010/0029263 | A1* | 2/2010 | Senoo | H04W 48/18 455/423 |
| 2014/0327537 | A1* | 11/2014 | Nagasaka | B60K 35/00 340/462 |
| 2018/0088201 | A1* | 3/2018 | Fujio | G01S 3/48 |
| 2018/0220973 | A1* | 8/2018 | Asianto | A61B 5/11 |

FOREIGN PATENT DOCUMENTS

| | | |
|---|---|---|
| JP | 2003-110694 | 4/2003 |
| JP | 2010-41101 | 2/2010 |
| JP | 2014-95956 | 5/2014 |
| JP | 2014-172604 | 9/2014 |
| JP | 2018-54386 | 4/2018 |

* cited by examiner

WIRELESS COMMUNICATION MANAGEMENT APPARATUS, WIRELESS COMMUNICATION MANAGEMENT SYSTEM, AND WIRELESS COMMUNICATION MANAGEMENT METHOD

BACKGROUND

Technical Field

The present disclosure relates to a wireless communication management apparatus, a wireless communication management system, and a wireless communication management method.

Background Art

For example, EP2774850A2 discloses a method of displaying passenger information on a monitor at each seat using an in-flight entertainment (IFE) system.

BRIEF SUMMARY

In recent years, many of the passengers carry their own wireless terminals such as smartphones. Passengers have a demand for using content etc. from the IFE system by allowing their wireless terminals to communicate with the IFE system. However, in moving objects such as aircrafts, the use of radio is often restricted in light of safety or by laws and regulations of countries. Furthermore, in an environment where passengers are not used, even if wireless communication is available, it may take time for passengers to make a wireless connection and thereby make passengers feel stressed.

The present disclosure provides a wireless communication management apparatus, a wireless communication management system, and a wireless communication management method that are effective to make the wireless connection accessible to users even in an environment where the use of wireless communication is restricted.

The wireless communication management apparatus according to the present disclosure is a wireless communication management apparatus that is connectable to one or more display devices and provides a service of wireless communication to a user in front of the display device. The wireless communication management apparatus comprises a communication unit, a wireless communication determination portion, a wireless terminal determination portion, and an output ordering portion. The communication unit acquires an image of the user. The wireless communication determination portion determines whether the wireless communication is enabled or disabled. The wireless terminal determination portion determines a wireless terminal used by the user based on the image. The output ordering portion causes the display device to output connection information when the wireless communication is enabled. The connection information indicates how to make a wireless connection for performing the wireless communication using the wireless terminal. The connection information is information corresponding to the wireless terminal determined by the wireless terminal determination portion.

The wireless communication management system according to the present disclosure comprises: the above-mentioned wireless communication management apparatus; one or more display devices connected to the above-mentioned wireless communication management apparatus; and one or more wireless access points connected to the above-mentioned wireless communication management apparatus.

The wireless communication management method according to the present disclosure is a wireless communication management method for providing a service of wireless connection to a user in a predetermined space. The method includes: acquiring an image of the user; determining whether the wireless communication is enabled or disabled in the predetermined space; determining the wireless terminal used by the user based on the image; and causing the display device to output connection information when the wireless communication is enabled. The connection information indicates how to make a wireless connection for performing the wireless communication using the wireless terminal. The connection information is information corresponding to the determined wireless terminal.

DETAILED DESCRIPTION

Hereinafter, embodiments will be described in detail, with reference to the drawings when appropriate. Any explanations deemed unnecessary may be omitted. For example, detailed descriptions of well-known aspects or duplicate descriptions of substantially identical components may be omitted from this disclosure.

It is to be noted that the attached drawings and the following description are provided to enable those skilled in the art to fully understand the present disclosure, and they are not intended to limit the claimed subject matter.

1. Embodiment 1

1-1. Configuration

1-1-1. Configuration of Wireless Communication Management System 1

Figure 1:
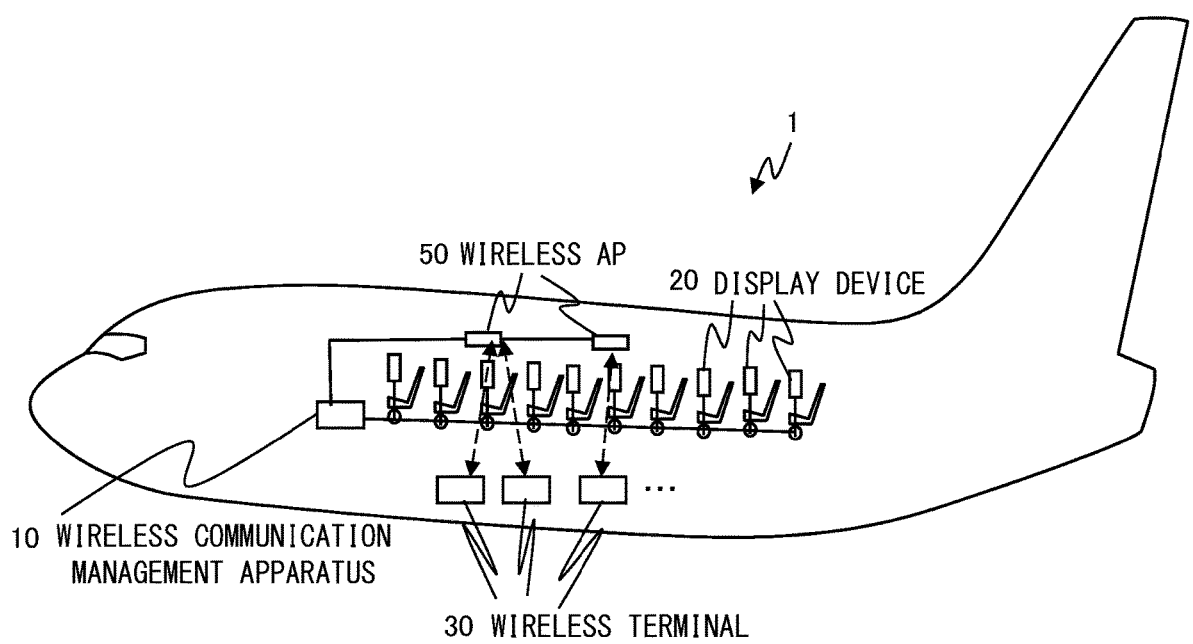
FIG. 1 is a layout diagram of the wireless communication management system according to Embodiment 1.

As shown in FIG. 1, the wireless communication management system 1 according to Embodiment 1 is disposed in an aircraft, which is an example of a moving object.

Figure 2:
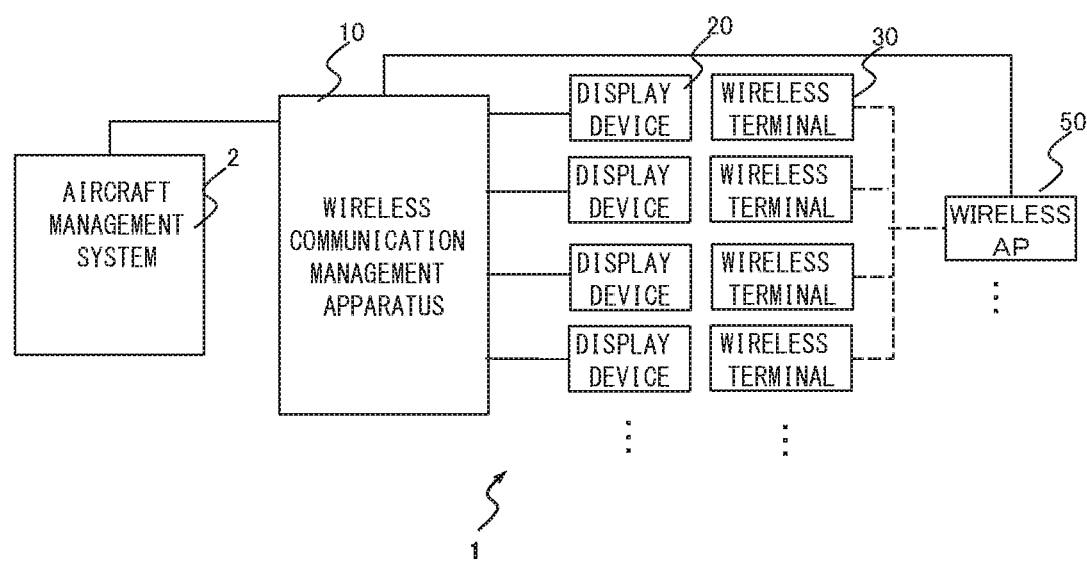
FIG. 2 is an entire configuration diagram of the wireless communication management system according to Embodiment 1.

As shown in FIGS. 1 and 2, the wireless communication management system 1 includes a wireless communication management apparatus 10, a display devices 20 disposed on a seat where a passenger (hereinafter referred to as a user) is to be seated, a wireless terminal 30 used by the user, and a wireless access point (AP) 50. The wireless communication management apparatus 10 is connected to a plurality of display devices 20 via a wired cable or a distributor (not shown). A plurality of wireless access points 50 are provided according to the size of the cabin of the aircraft and the number of seats.

The wireless communication management system 1 is connectable to the aircraft management system 2, and acquires aircraft location information and the like, as will be described later. The aircraft management system 2 acquires, updates and stores management information for the aircraft. The management information includes operational information (estimated arrival time, departure time, velocity, direction of travel, etc.), location information (longitude, latitude, altitude, etc.) on the aircraft, seat information (seat number, etc.) and other such information.

The wireless communication management system 1 may function as a part of the IFE system.

The configuration of each device included in the wireless communication management system 1 will be described below with reference to FIGS. 3 to 5.

1-1-2. Configuration of Wireless Communication Management Apparatus 10

The wireless communication management apparatus 10 is, for example, a computer device that functions as a server. The wireless communication management apparatus 10 is connectable to one or more display devices 20 and provides a wireless communication service to users who are seated in front of the display devices 20.

Figure 3:
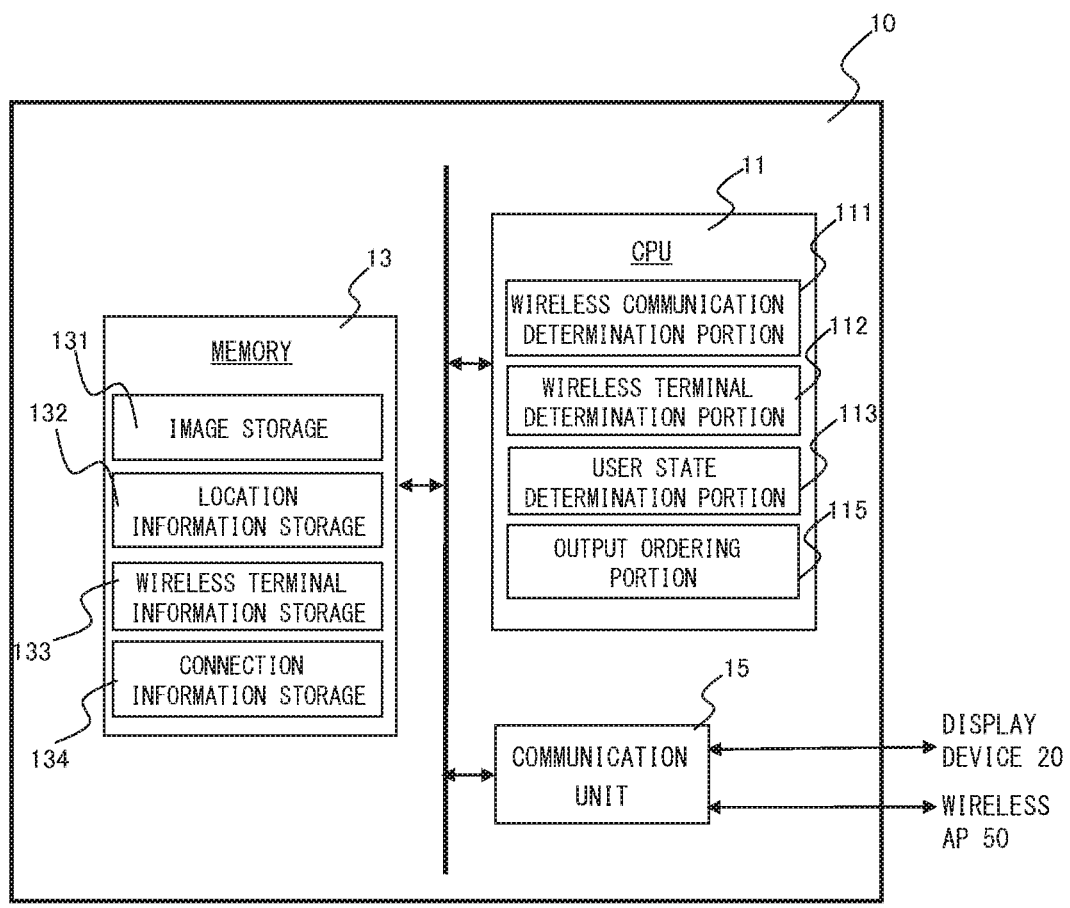
FIG. 3 is a schematic configuration diagram of the wireless communication management apparatus according to Embodiment 1.
Figure 4:
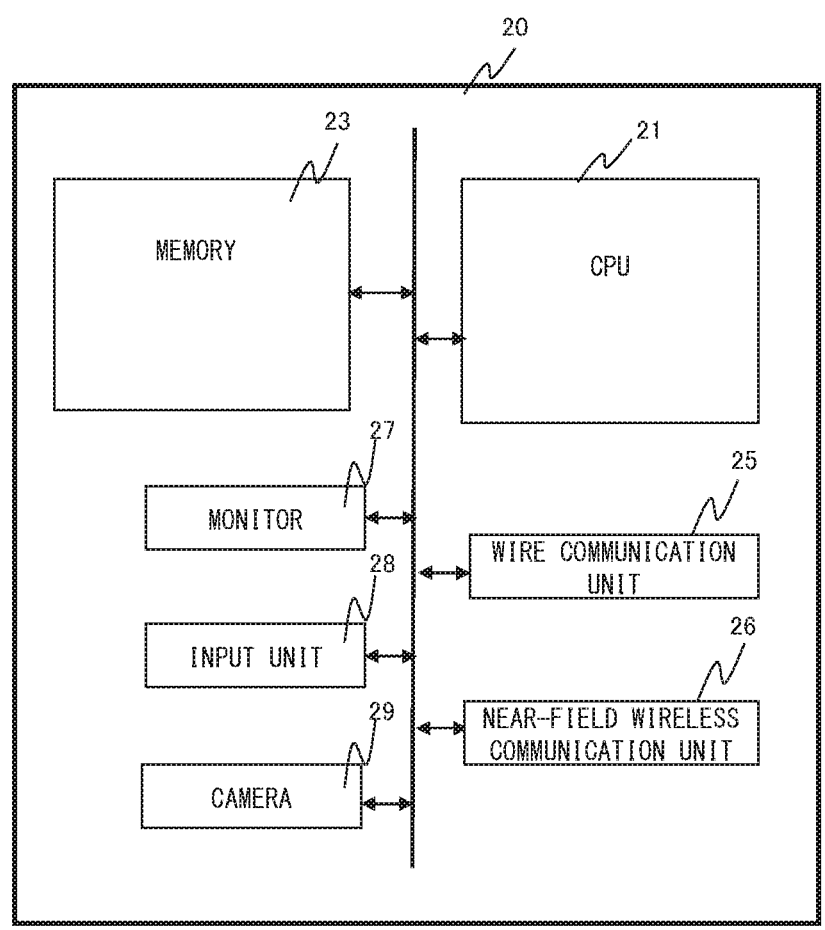
FIG. 4 is a schematic configuration diagram of the display device according to Embodiment 1.

As shown in FIG. 3, the wireless communication management apparatus 10 includes a CPU 11, a memory 13 and a communication unit 15 connected to each other via a predetermined bus.

The CPU 11 (an example of a controller) implements each function of the wireless communication management apparatus 10 by executing a predetermined program. The wireless communication management apparatus 10 implements, as functions, a wireless communication determination portion 111, a wireless terminal determination portion 112, a user state determination portion 113 and an output ordering portion 115.

The wireless communication determination portion 111 determines whether wireless communication is enabled or disabled in the aircraft. Whether wireless communication is enabled or disabled is determined by, for example, the state of the aircraft, such as whether it is being takeoff or landing, or in stable flight, etc.). Whether wireless communication is enabled or disabled can be also determined by the laws and regulations of the countries that are to be applied to the aircraft. Therefore, the wireless communication determination portion 111 determines, for example, from the location information of the aircraft, whether it is currently permitted to use wireless communication within the aircraft. The location information of the aircraft may be obtained from GPS information of the aircraft.

The wireless terminal determination portion 112 determines a wireless terminal to be used by the user based on an image of the user seated in front of the display device 20. The wireless terminal determination portion 112 mainly determines the presence and type of the wireless terminal. The wireless terminal determination portion 112 determines whether or not the acquired image includes an image of a wireless terminal, based on characteristic information (shapes etc.) of various types of wireless terminals. The characteristic information is stored in memory in advance. The wireless terminal determination portion 112 further determines the type of the wireless terminal. The type of wireless terminal is, for example, whether it is a smartphone, headphones, a digital camera, a portable game terminal, a handset, a remote controller, PC or the like.

The wireless terminal determination portion 112 further determines a wireless communication system applied to the wireless terminal. The wireless communication system is, for example, Wi-Fi (registered trademark) or Bluetooth (registered trademark). For example, if the wireless terminal determined by the wireless terminal determination portion 112 is a smartphone, the wireless communication system is determined to be Wi-Fi. If the wireless terminal is headphones, the wireless communication system is determined to be Bluetooth. Alternatively, the wireless terminal determination portion 112 may determine the wireless communication system by identifying a mark for the wireless communication system within the image, such as a mark or logo indicated on the wireless terminal.

The user state determination portion 113 determines whether the user is using a wireless terminal. The user state determination portion 113 determines whether the user is using the wireless terminal from the image. The determination can be made based on, for example, whether the user is holding the wireless terminal in hand or the user is moving his hand near the wireless terminal in the image. Alternatively, the user state determination portion 113 may determine whether the user needs a wireless connection, based on the user's expression or action included in the image. For example, the user state determination portion 113 may determine that the user needs a wireless connection by judging that the user is in a state of being confused because the user does not know how to make the wireless connection setting. On the other hand, when the user state determination portion 113 determines from the image that the user is closing his/her eyes (in a sleeping state), it can determine that the user does not need a wireless connection with the user's wireless terminal. The user state determination portion 113 may also obtain the operation information of the display device 20, for example, information on whether a movie or program is being distributed to the display device 20 by IFE, based on which the state of the user can be determined. For example, during distribution of a movie or program, it may be determined that the user does not need a wireless connection with the user's wireless terminal.

The output ordering portion 115 transmits an order to a corresponding display device 20 to display connection information when wireless communication is enabled. The connection information indicates how to make a wireless connection for performing wireless communication using the user's wireless terminal. The connection information is information corresponding to the wireless terminal determined by the wireless terminal determination portion 112. More specifically, the connection information is connection information according to the wireless communication system determined by the wireless terminal determination portion 112, such as how to set ID information and a password for connecting to the wireless access point 50, or how to set pairing.

The output ordering portion 115 may transmit an order to each display device 20 to display wireless communication information indicating whether the wireless communication is enabled or disabled. The wireless communication information may include information on an access point capable of wireless communication with the wireless terminals, such as ID information and a password. The output ordering portion 115 may transmit an order to each display device 20 so as to display scheduled time when the wireless communication is enabled or when the wireless communication is disabled, based on the location information and/or the operation schedule of the aircraft.

The memory 13 includes a semiconductor memory, a flash memory, a nonvolatile memory such as an HDD, or a combination thereof. The memory 13 stores software programs used in the wireless communication management apparatus 10 and various data. In particular, the memory 13 includes an image storage 131, location information storage 132, wireless terminal information storage 133, and connection information storage 134.

The image storage 131 stores an image of the user at each seat where the display device 20 is installed. The image of the user is updated at every predetermined time. The location information storage 132 stores location information of the aircraft. The location information of the aircraft is updated at every predetermined time. The wireless terminal information storage 133 stores characteristic information (shape, etc.) according to the types of wireless terminals. These pieces of characteristic information may be updated by accumulating image information each time the number of types of wireless terminals that need to be determined increases. The connection information storage 134 stores connection information of wireless communication systems that can be applied to various types of wireless terminals.

The communication unit 15 includes a circuit for communicating with a computer device connected to the wireless communication management apparatus 10, such as a network card or a network adapter. The communication unit 15 is connected to the display devices 20 and the wireless access point 50 via a cable or the like.

1-1-3. Configuration of Display Device 20

A display device 20 is installed at each seat. As shown in FIG. 4, the display device 20 includes a CPU 21, a memory 23, a wire communication unit 25, a near-field wireless communication unit 26, a monitor 27, an input unit 28, and a camera 29 for implementing the functions of the display device 20.

The CPU 21 implements each function of the display device 20 by executing a predetermined program. In response to a displaying order from the wireless communication management apparatus 10, the CPU 21 causes the monitor 27 to display information on whether the wireless communication is enabled or disabled, how to make a wireless connection with the designated wireless terminal, or the like. The CPU 21 also acquires an image of the user captured by the camera 29, which will be described later. The CPU 21 transmits the image to the wireless communication management apparatus 10 via the wire communication unit 25.

The memory 23 stores data transmitted from the wireless communication management apparatus 10 and a program for controlling the display device 20.

The monitor 27 has a display screen such as an LCD or an organic EL display. The monitor 27 is attached at such a position that the user, who is a passenger and seated, can see the monitor 27 easily. The position may be, for example, the rear portion of a seat in front of the user.

The input unit 28 is an input unit such as a touch panel displayed on the monitor 27 or a remote controller provided with operation buttons. The input unit 28 transmits information input by the user's operation to the CPU 21.

The wire communication unit 25 includes, for example, a connection terminal, and is connected to the wireless communication management apparatus 10 via a cable or the like.

The near-field wireless communication unit 26 (an example of a wireless communication unit) includes an antenna for wireless communication, a wireless circuit, or the like, and performs data communication with a wireless terminal by wireless communication at close range. For example, Bluetooth is used as a wireless communication system used in this data communication. The near-field wireless communication unit 26 is turned on or off according to an order from the wireless communication management apparatus 10. If wireless communication is disabled in the aircraft, the near-field wireless communication unit 26 is turned off, and if wireless communication is enabled, it is turned on.

The camera 29 is disposed so as to have an imaging range in front of the monitor 27. The camera 29 captures an image of the user seated in front of the monitor 27.

1-1-4. Configuration of Wireless Access Point 50

Figure 5:
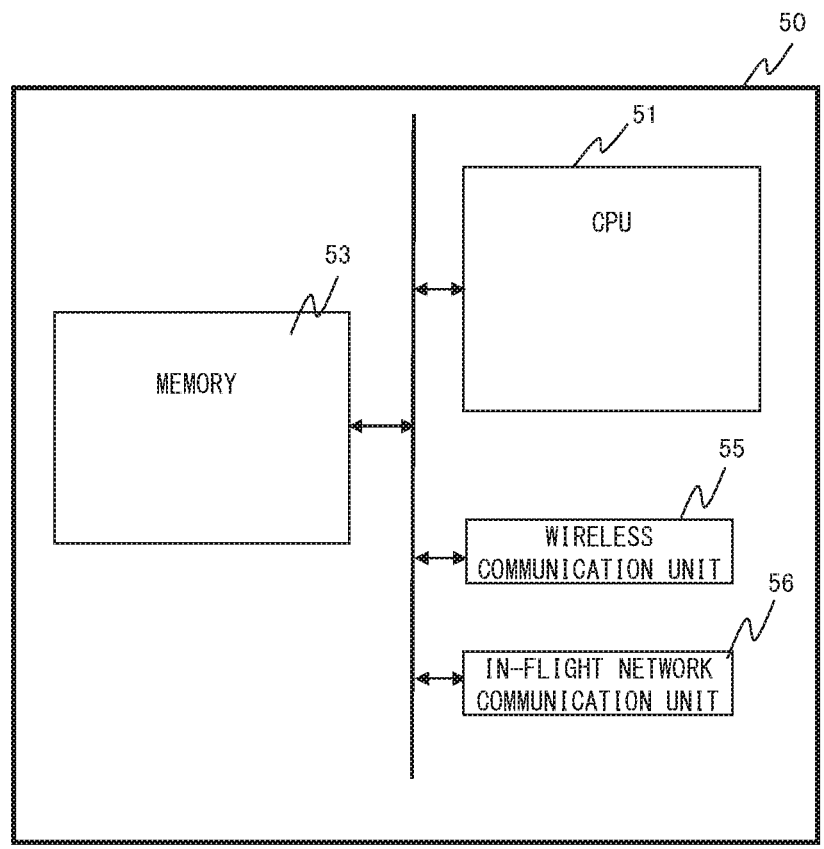
FIG. 5 is a schematic configuration diagram of the wireless access point according to Embodiment 1.

As shown in FIG. 5, the wireless access point 50 is, for example, a Wi-Fi access point. The wireless access point 50 includes a CPU 51, a memory 53, a wireless communication unit 55, and an in-flight network (NW) communication unit 56.

The CPU 51 implements each function of the wireless access point 50 by executing a predetermined program. In particular, the CPU 51 controls the wireless connection between the wireless communication unit 55 and the wireless terminal 30 to connect each wireless terminal 30 to the wireless communication management apparatus 10.

The memory 53 stores data and a program for controlling the wireless access point 50.

The wireless communication unit 55 transmits a beacon signal and establishes a wireless connection with the wireless terminal 30 when wireless communication is enabled in the aircraft.

The in-flight network communication unit 56 includes, for example, a connection terminal, and is connected to the wireless communication management apparatus 10 via a cable or the like.

The wireless access point 50 may have such a configuration that is connected to the aircraft management system 2 (FIG. 2) and connectable to the wireless communication management apparatus 10 via the aircraft management system 2.

1-1-5. Configuration of Wireless Terminal 30

The wireless terminal 30 is a computer terminal that the user owns or can use. The wireless terminal 30 is, for example, a computer device capable of having a wireless communication function, such as a smartphone, headphones, a digital camera, a portable game terminal, a handset, a remote controller, a PC and the like. For example, the wireless terminal 30 has a wireless communication function according to one or more wireless communication systems such as Wi-Fi and Bluetooth.

1-2. Operation

The operation of the wireless communication management apparatus 10 will be described with reference to FIG. 6.

Location information of the aircraft is acquired by the wireless communication determination portion 111 of the wireless communication management apparatus 10 (S101). Based on the location information of the aircraft, it is determined whether wireless communication is enabled (S102). For example, if the aircraft is in a state in which in-flight wireless communication may be performed in light of the law that is to be applied to the aircraft and in light of safety, the wireless communication is set to be enabled. The wireless access point 50 or the display device 20 may be given an order and set to enable or disable the wireless communication via the wireless communication management apparatus 10.

When the wireless communication is enabled (Yes in S102), the wireless terminal determination portion 112 acquires an image of the user acquired from the camera 29 of each display device 20 (S103). The wireless terminal determination portion 112 determines whether the wireless terminal 30 is present or not from the acquired image (S104). The presence or absence of the wireless terminal 30 is determined based on the characteristic information (such as a shape) of the wireless terminal 30, which is stored in advance. The wireless terminal determination portion 112 also determines the type of the wireless terminal 30. For example, it is determined that the wireless terminal 30 is a smartphone.

The user state determination portion 113 determines whether the user is using the wireless terminal 30 based on the image (S105). For example, when the user is moving his hand near the wireless terminal 30, it can be determined that the user needs a wireless connection with the wireless terminal 30.

The wireless terminal determination portion 112 determines a wireless communication system to be applied to the determined wireless terminal 30 (S106). For example, in the case of a smartphone, Wi-Fi can be determined as the wireless communication system.

The output ordering portion 115 acquires from the memory 13 connection information corresponding to the determined wireless communication system, and orders the display device 20 to display the connection information (S107). Here, the display device 20 displays information on how to make a Wi-Fi connection, such as setting ID information and a password for connecting the wireless terminal 30 to the wireless access point 50. The user can connect the wireless terminal 30 to the wireless access point 50 by operating the wireless terminal 30 at hand according to the connection information displayed on the display device 20.

On the other hand, when the wireless terminal 30 determined in step S104 is headphones, Bluetooth is determined as the wireless communication system (S106). In this case, the corresponding display device 20 displays information on how to make a Bluetooth connection, such as pairing setting.

Figure 6:
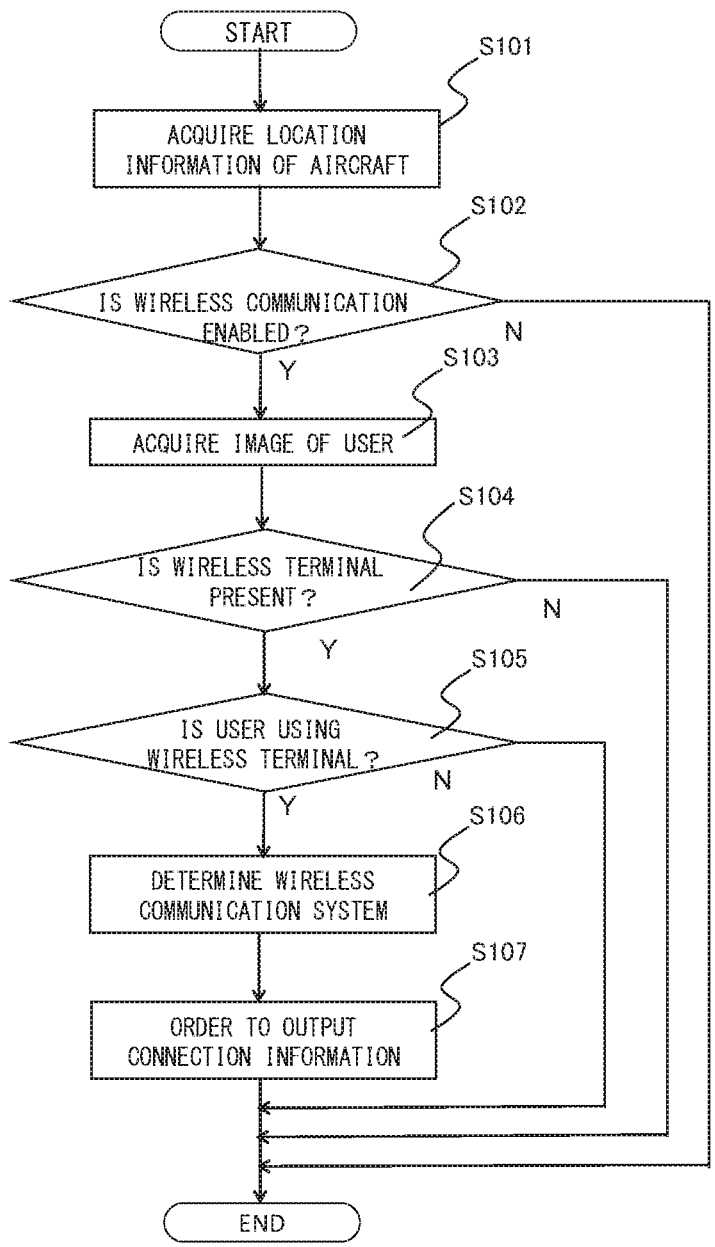
FIG. 6 is a flowchart showing an operation of the wireless communication management apparatus according to Embodiment 1.

The flowchart shown in FIG. 6 is not limited to the one described. The order of the processes may be partially exchanged or may be performed in parallel.

1-3. Features, etc.

In the wireless communication management apparatus 10 or the wireless management method according to Embodiment 1, an image of the user is acquired, and the type of the wireless terminal 30 used by the user is determined based on the image. When the wireless communication is enabled, the display device 20 displays connection information indicating how to make a wireless connection for performing the wireless communication using the wireless terminal 30. The connection information is information according to the determined type of the wireless terminal 30.

Even in an environment where it is difficult for the user to use the wireless communication, such as in an aircraft, the display device 20 automatically displays information on how to make a wireless connection using Wi-Fi or Bluetooth when needed by the user. This helps the user to make a wireless connection with the user's wireless terminal 30, thereby reducing stress on the user. On the other hand, it is possible to prevent giving unnecessary information and annoyance to the user who does not need a wireless connection. In addition, the cost for preparing operation manuals for the wireless communication in the aircraft can be reduced, and the crew members in the aircraft can have a less burden due to a number of inquiries from passengers.

In addition to the determination on whether the wireless terminal 30 is present or not and what the type of the wireless terminal 30 is, connection information can be displayed on the display device 20 only when it is determined that the user is using the wireless terminal 30. Therefore, the connection information can be provided only to a user who is highly likely to use the wireless communication.

2. Other Embodiments

The above-mentioned embodiment was described as an illustration of technology described in this application. However, the technology herein is not limited to that described above and may also be applied to embodiments in which said technology has been changed, replaced, added or omitted as needed. Moreover, components in the above-described embodiments may be combined to form new embodiments.

<1>

The wireless communication management apparatus 10 shown in FIG. 3 may not have the function of the user state determination portion 113. In other words, step S105 of FIG. 6 may be omitted. That is, the wireless communication management apparatus 10 may transmit an order to the corresponding display device 20 to display connection information in accordance with the determination results of the wireless communication determination portion 111 and the wireless terminal determination portion 112 only.

<2>

Most users using wireless communication may want to use wireless communication connected to the wireless access point 50, such as Wi-Fi. Therefore, the wireless communication management apparatus 10 shown in FIG. 3 may provide connection information of only one wireless communication system. In this case, the wireless communication management apparatus 10 may determine only whether the wireless communication is enabled in step S102 of FIG. 6 and whether the wireless terminal 30 is present in step S104. The connection system specified in step S106 is a wireless connection system using the wireless access point 50, for example, Wi-Fi. The wireless communication management apparatus 10 causes the display device 20 to display information on how to make a wireless connection according to the wireless connection system.

<3>

The wireless communication system is not limited to Wi-Fi or Bluetooth as described above. Other wireless communication systems may be used.

<4>

The wireless communication management apparatus 10 may determine whether the wireless communication is enabled or disabled in an aircraft, based on the flight schedule of the aircraft.

<5>

The wireless terminal determination portion 112 of the wireless communication management apparatus 10 shown in FIG. 3 may estimate a direction of arrival or a strength of radio signals from the wireless terminal 30 to the display device 20, and may determine the wireless terminal 30 based on the estimation result. In this case, the CPU 21 of the display device 20 shown in FIG. 4 acquires the arrival direction and the strength of the wireless signals received by the near-field wireless communication unit 26, and transmits it to the wireless communication management apparatus 10 via the wire communication unit 25. The wireless terminal determination portion 112 of the wireless communication management apparatus 10 may determine the presence or absence of the wireless terminal 30 or the type thereof based on the acquired arrival direction or strength of the wireless signals.

<6>

The wireless terminal determination portion 112 of the wireless communication management apparatus 10 shown in FIG. 3 may determine a model of the wireless terminal 30 based on the image, and the output ordering portion 115 may cause the display device 20 to output connection information according to the determined model of the wireless terminal 30. The model of the wireless terminal 30 of the same type (for example, a smartphone) differs between manufacturers or designs. In this case, as in Embodiment 1, the wireless terminal information storage 133 of the wireless communication management apparatus 10 may store characteristic information (shape, design, logo mark, etc.) according to models of the wireless terminal 30. These pieces of characteristic information may be stored and updated as the image information, every time the number of models of the wireless terminal 30 which need to be determined increases.

<7>

The wireless communication management apparatus 10 shown in FIG. 3 acquires an image of the user from the camera 29 of the display device 20, but it is not limited thereto. The image of the user may be an image acquired from another camera set in the aircraft. The wireless communication management apparatus 10 may perform face recognition processing on the image acquired from each display device 20, and based on only the face-recognized image (that is, only when the user is seated at a seat), the determination on the wireless terminal 30 or the user state may be made.

<8>

In Embodiment 1, some or all of the processing for each functional block may be executed by a program. Further, some or all of the processing for each functional block may be executed by a processer in a computer. The program for executing this processing may be stored in a storage device such as a hard disk or a ROM and run by being read out by the ROM or a RAM.

<9>

In Embodiment 1, the processor described as a CPU or the like may be replaced with a processor that is configured as a dedicated electronic circuit designed to implement predetermined functions. Also, the processor may be configured of one or more processors. Furthermore, in the present specification, an apparatus includes the case where a plurality of constituent elements (apparatus, modules (parts), etc.) mean a group, and it does not matter whether all the constituent elements are in the same housing or not.

A "system" may refer to both a plurality of devices located in separate housings and connected to each other via a network, and one device in which a plurality of modules are located in one housing.

<10>

In the above embodiments, an example in which the wireless communication management system 1 of the present disclosure is installed in an aircraft has been described. However, the present disclosure is not limited to this. The wireless communication management system 1 may be installed in another vehicle such as a helicopter, a train, a bus, or another mobile object. Furthermore, the wireless communication management system 1 may be installed in a facility or a building where wireless communication is limited according to time.

What is claimed:

1. A wireless communication management apparatus connectable to one or more display devices for providing a service of wireless communication to a user in front of the display device, the wireless communication management apparatus comprising:
a communication unit for acquiring an image of the user; and
a controller including a circuit,
the controller is operable to:
determine whether the wireless communication is enabled or disabled in a predetermined space;
determine a wireless terminal used by the user, based on the image of the user; and
cause the display device to output connection information when the wireless communication is enabled, the connection information indicating how to make a wireless connection for performing the wireless communication using the wireless terminal, the connection information being information corresponding to the determined wireless terminal;
wherein the wireless communication management apparatus is disposed in a moving object, and the controller is operable to determine whether the wireless communication is enabled or disabled, based on location information of the moving object.

2. The wireless communication management apparatus according to claim 1, wherein the controller is operable to:
determine a type of the wireless terminal based on the image; and
cause the display device to output the connection information according to the type of the wireless terminal.

3. The wireless communication management apparatus according to claim 1, wherein the controller is operable to:
determine a wireless communication system applied to the wireless terminal, and cause the display device to output the connection information according to the determined wireless communication system.

4. The wireless communication management apparatus according to claim 1, wherein the controller is operable to cause the display device to output wireless communication information indicating whether the wireless communication is enabled or disabled.

5. The wireless communication management apparatus according to claim 4, wherein the wireless communication information includes information on an access point capable of wireless communication with the wireless terminal.

6. The wireless communication management apparatus according to claim 1, wherein the controller is operable to estimate an arrival direction of a wireless signal from the wireless terminal to the display device and determine the wireless terminal based on the estimation result.

7. The wireless communication management apparatus according to claim 1, wherein the controller is operable to:
determine a model of the wireless terminal; and
cause the display device to output the connection information according to the model of the wireless terminal.

8. The wireless communication management apparatus according to claim 1, wherein the controller is operable to:
determine whether the user uses the wireless terminal; and
cause the display device to output the connection information only when it is determined that the user uses the wireless terminal.

9. A wireless communication management system comprising:
the wireless communication management apparatus according to claim 1;
one or more display devices connectable to the wireless communication management apparatus; and one or more wireless access points connectable to the wireless communication management apparatus.

10. The wireless communication management system according to claim 9, wherein the one or more wireless access points are capable of communicating with the wireless terminal by a first wireless communication system, the display device includes a wireless communication unit capable of communicating with the wireless terminal by a second wireless communication system different from the first wireless communication system, and the controller is operable to:

determine whether the wireless terminal is suitable for the first wireless communication system or the second wireless communication system, based on the image; and cause the display device to output the connection information according to the determined wireless communication system.

11. A wireless communication management method for providing a service of wireless communication to a user in a predetermined space, the wireless communication management method including:

acquiring an image of the user;

determining by a controller apparatus whether the wireless communication is enabled or disabled in the predetermined space;

determining a wireless terminal used by the user, based on the image of the user, wherein the wireless terminal is disposed in a moving object;

causing a display device to output connection information when the wireless communication is enabled, the connection information indicating how to make a wireless connection for performing the wireless communication using the wireless terminal, the connection information being information corresponding to the determined wireless terminal; and determining by the controller apparatus whether the wireless communication is enabled or disabled, based on location information of the moving object.

* * * * *